(12) United States Patent
Cravey

(10) Patent No.: US 7,788,774 B1
(45) Date of Patent: Sep. 7, 2010

(54) TWIST LOCK CLASP AND COUPLING METHOD

(76) Inventor: Paul Brian Cravey, 4616 Pineridge, Houston, TX (US) 77009

( * ) Notice: Subject to any disclaimer, the term of this patent is extended or adjusted under 35 U.S.C. 154(b) by 489 days.

(21) Appl. No.: 11/900,101

(22) Filed: Sep. 10, 2007

(51) Int. Cl.
A44C 27/00 (2006.01)

(52) U.S. Cl. .................. 24/587.11; 24/590.1; 24/589.1; 24/663; 63/3.1

(58) Field of Classification Search ............... 24/663, 24/DIG. 53–DIG. 60, 587.11, 589.1, 593.1, 24/594.11, 596.1, 598.4, 598.1, 573.11, 574.1, 24/578.14, 580.1, 584.1, 590.1, 580.11, 595.1, 24/638, 643, 647, 650, 653; 63/3.1, 10, 3, 63/21, 33, 38; 403/348–353; 312/111, 140
See application file for complete search history.

(56) References Cited

U.S. PATENT DOCUMENTS

| | | | | |
|---|---|---|---|---|
| 867,162 | A * | 9/1907 | Seidl | ......................... 24/574.1 |
| 913,854 | A * | 3/1909 | Seidl | ....................... 24/587.11 |
| 1,771,427 | A | 7/1930 | Waterhouse | |
| 3,487,512 | A * | 1/1970 | Marosy | .................... 24/573.11 |
| 3,540,087 | A * | 11/1970 | Marosy | .................... 24/573.11 |
| 3,540,091 | A | 11/1970 | Marosy | |
| 3,543,356 | A | 12/1970 | Zimmermann | |
| 3,743,147 | A * | 7/1973 | Wilczynski | ................. 224/199 |
| 3,900,927 | A * | 8/1975 | D'Angelo et al. | ............. 24/667 |
| 3,936,914 | A | 2/1976 | Mancini | |
| 4,170,809 | A | 10/1979 | Geldwerth et al. | |
| 4,184,232 | A | 1/1980 | Marosy | |
| 4,236,283 | A * | 12/1980 | Marosy | .................... 24/573.11 |
| 4,364,155 | A | 12/1982 | Synowicki | |
| 4,377,078 | A | 3/1983 | Block | |
| 4,622,726 | A * | 11/1986 | Nakamura | ................. 24/574.1 |
| 4,679,959 | A * | 7/1987 | Cavallaro | .................... 403/143 |
| 5,054,170 | A * | 10/1991 | Otrusina | .................. 24/580.11 |
| 5,095,594 | A | 3/1992 | Marosy | |
| 5,157,945 | A * | 10/1992 | Giehl | ............................. 63/33 |
| 5,274,885 | A * | 1/1994 | Hellweg | ...................... 24/3.12 |
| 5,367,891 | A * | 11/1994 | Furuyama | .................... 63/29.2 |
| 5,647,103 | A | 7/1997 | Foster | |
| 5,651,522 | A * | 7/1997 | Davis et al. | ............. 248/221.11 |
| 6,058,576 | A * | 5/2000 | Harris | ..................... 24/265 EC |
| 6,807,743 | B2 * | 10/2004 | Odachowski | ................ 33/465 |
| 6,826,806 | B2 * | 12/2004 | Eaton et al. | ................ 24/115 F |

* cited by examiner

Primary Examiner—Victor Batson
Assistant Examiner—Rowland D Do
(74) Attorney, Agent, or Firm—Kenneth A. Roddy

(57) ABSTRACT

A releasable clasp or coupling includes a female member and a male member each having a cylindrical body, a flat front end disposed at an angle diagonal to the longitudinal axis of its body, and a rear end adapted to be connected to the end of a flexible member such a necklace, or the like. The female member has an aperture through its diagonal front end and the male member has a tongue element that extends outwardly from its diagonal front end. The aperture and the tongue element are aligned and slidably engaged to place the diagonal front ends face-to-face, and upon relative pivotal movement of the bodies, the longitudinal axis of the male and female members become axially aligned and the aperture and tongue element become oriented out of alignment to prevent accidental removal. The tongue may also frictionally engage the female member.

10 Claims, 2 Drawing Sheets

TWIST LOCK CLASP AND COUPLING METHOD

BACKGROUND OF THE INVENTION

1. Field of the Invention

This invention relates generally to clasps and couplings for releasably connecting the free ends of chains, wires or cables, and more particularly to a twist lock clasp and coupling method for releasably connecting the free ends of pieces of jewelry such as necklaces, neck chains, chain bracelets and the like.

2. Background Art

Many types of clasps and couplings are known in the art for connecting together the free ends of a piece of jewelry such as a necklace, neck chain, bracelet and the like. Typically, such couplings are generally in the form of spring clasps, spring rings, split rings with spring-biased jaw, and some have mating male and female members with mating tongue and slot arrangements that are connected together by rotating the mating male and female members. The latching mechanisms such as spring clasps, spring rings split rings with spring-biased jaws, and tongue and slot arrangements must be sturdy to avoid accidental disconnection and withstand repeated use. Such clasps and couplings including the latching mechanisms are, by necessity, relatively small in size so as to be inconspicuous and avoid detracting from the aesthetic appearance of the piece of jewelry.

Due to their small size, one of the common problems with conventional clasps and couplings is that they are difficult to connect and disconnect, for example when attempting to align the male and female members at the free ends of the piece of jewelry and hold them adjacent to each other, engaging the small mating latching elements, operating the spring-biased jaw, or aligning the tongue and slot and pushing them together.

It is particularly difficult to connect and disconnect conventional clasps and couplings when the latching mechanisms cannot be seen, such as attempting to fasten the free ends of a necklace or neck chain behind one's neck. In these situations, the wearer usually has to carry out the aligning and connecting and disconnecting operation relying on touch and feel, rather than sight.

There are several patents directed toward clasps and couplings for connecting together the free ends of a piece of jewelry which have male and female members with various types of latching mechanisms including spring clasps and mating tongue and slot arrangements that are connected together by rotating the male and female members.

Marosy, U.S. Pat. No. 4,184,232 discloses a quick connect and disconnect coupling for connecting the free ends of pieces of jewelry such as bracelets, chain bracelets, neck chains, necklaces and the like. The coupling comprises a male member having a T-shaped element that is received into a slotted aperture in the end plate of a female member. A pair of flat springs disposed in the female member engages the branches of the T-shaped element and resiliently rotate the male member such that the projecting lateral ears of the T-shaped element are engaged behind the end plate of the female member.

Mancini, U.S. Pat. No. 3,936,914 discloses a separable fastener for releasably connecting the ends of a flexible member, comprising first and second substantially flat body members, one of the members has a transverse upwardly extending flange at one end, with a centrally positioned opening adjacent to the flange and bridged thereby, and centrally positioned upwardly and downwardly extending lugs thereon. The second member has a centrally positioned, gently curved, reversely bent tongue adapted to extend beneath the flange, upwardly through the opening, and then rearwardly over the flange to releasably interconnect the members. The tongue has a centrally positioned longitudinal slot therein through which the lugs extend, whereby the members must be positioned perpendicular to each other to permit connection or disconnection therebetween.

The present invention overcomes the aforementioned problems and is distinguished over the prior art in general, and these patents in particular by a releasable clasp or coupling that includes a female member and a male member each having a cylindrical or tubular body extending along a longitudinal axis and a flat rear end adapted to be connected to the end link of a piece of jewelry, such as a necklace, or the like. The female member has a flat front end disposed at an angle diagonal to the longitudinal axis of its body with a centrally disposed aperture through its front end. The male member has a flat front end disposed at an angle diagonal to the longitudinal axis of its body at substantially the same angle as the front end of the female member, and a tongue element that extends perpendicularly outwardly from its diagonal front end. The aperture and the tongue element are aligned and slidably engaged, and upon relative pivotal movement, the longitudinal axis of the male and female members become axially aligned and the aperture and the tongue element become oriented out of alignment to prevent accidental removal. The tongue element may be configured to frictionally engage the female member upon relative pivotal movement to releasably maintain the members in the coupled condition.

While primarily adaptable for use in connection with articles of jewelry, it is obviously not limited thereto; but rather the clasp or coupling and coupling method of the present invention may be used in any environment where it is desired to releasably connect spaced ends of a flexible member, including industrial applications.

SUMMARY OF THE INVENTION

It is therefore an object of the present invention to provide a releasable clasp or coupling for releasably connecting spaced ends of a flexible member, such as a neck chain or necklace, that is easily aligned, connected, and disconnected by a user relying on touch or feel and may effectively be connected and disconnected by the user while it is located behind the user's neck.

It is another object of this invention to provide a releasable clasp or coupling having a latching mechanism that when connected assumes a secure locked or latched position to substantially reduce the possibility of accidental disconnection during use.

Another object of this invention is to provide a releasable clasp or coupling having male and female members with a latching mechanism that assumes a frictionally engaged condition when the members are connected to substantially reduce the possibility of accidental disconnection during use.

Another object of this invention is to provide a releasable clasp or coupling having male and female members that may be of relatively small size so as not to aesthetically detract from the article with which it is associated, particularly where such article is a jewelry product.

Another object of this invention is to provide a releasable clasp or coupling for releasably connecting spaced ends of a flexible member, such as a chain or cable, that is easily aligned, connected, and disconnected by a user.

A further object of this invention is to provide a twist lock coupling and coupling method for releasably connecting the free ends of a flexible member that may be utilized in consumer products, such as necklaces, neck chains, chain bracelets, and in industrial applications for releasably connecting the ends of a chain, cable, or rope.

A still further object of this invention is to provide a releasable clasp or coupling that is simple in construction, inexpensive to manufacture, and rugged and reliable in operation.

Other objects of the invention will become apparent from time to time throughout the specification and claims as hereinafter related.

The above noted objects and other objects of the invention are accomplished by a releasable clasp or coupling that includes a female member and a male member each having a cylindrical or tubular body extending along a longitudinal axis and a flat rear end adapted to be connected to the end link of a piece of jewelry, such as a necklace, or the like. The female member has a flat front end disposed at an angle diagonal to the longitudinal axis of its body with a centrally disposed aperture through its front end. The male member has a flat front end disposed at an angle diagonal to the longitudinal axis of its body at substantially the same angle as the front end of the female member, and a tongue element that extends perpendicularly outwardly from its diagonal front end. The aperture and the tongue element are aligned and slidably engaged, and upon relative pivotal movement, the longitudinal axis of the male and female members become axially aligned and the aperture and the tongue element become oriented out of alignment to prevent accidental removal. The tongue element may be configured to frictionally engage the female member upon relative pivotal movement to releasably maintain the members in the coupled condition.

While primarily adaptable for use in connection with articles of jewelry, it is obviously not limited thereto; but rather the clasp or coupling and coupling method of the present invention may be used in any environment where it is desired to releasably connect spaced ends of a flexible member, including industrial applications.

DESCRIPTION OF THE PREFERRED EMBODIMENT

Figure 1:
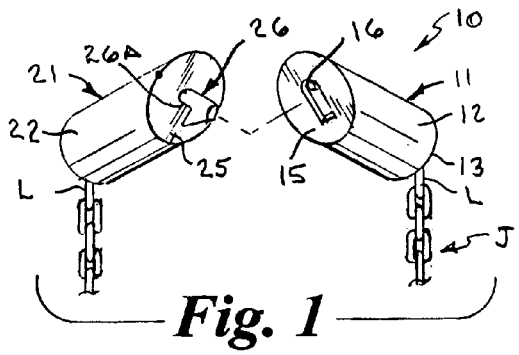
FIG. 1 is a perspective view of the releasable clasp or coupling in accordance with the present invention, showing the male and female members in a disengaged uncoupled condition.

In the following discussion, the clasp or coupling of the present invention is described, for purposes of example, as a clasp or coupling for uniting the two free ends of a pliable piece of jewelry such as a neck chain, a necklace, a bracelet or the like, however, it should be understood that the clasp structure and the method of coupling of the present invention can utilized for any type of application where it is desired to releasably connect spaced ends of a flexible member, including industrial and other utilitarian mechanical applications.

Referring to FIGS. 1-6, the releasable clasp or coupling 10 in accordance with the present invention includes a female member 11 and a male member 21 which are preferably made of a metal matching the metal of the piece of jewelry whose ends are to be connected by the members. The female member 11 has a generally hollow cylindrical or tubular body 12 extending along a longitudinal axis A1 with a flat rear end wall 13 provided with a loop 14 for mounting therethrough the end link L at one free end of a piece of jewelry J, such as a necklace, neck chain, bracelet, or the like. The female member 11 has a flat diagonal front end wall 15, disposed at an angle diagonal to the longitudinal axis A1 of its cylindrical or tubular body 12 with a centrally disposed slot 16 extending therethrough.

The male member 21 of the coupling has generally cylindrical or tubular body 22 extending along a longitudinal axis A2 with a flat rear end wall 23 provided with a loop 24 for mounting therethrough the end link L at the other free end of the piece of jewelry J, and a flat diagonal front end wall 25 which is disposed at an angle diagonal to the longitudinal axis A2 of its body 22, and at substantially the same angle as the diagonal front end wall 12 of the female member 11. A key or tongue element 26 extends a sort distance perpendicularly outwardly from the flat face of the diagonal front end wall 25. The tongue element 26 has a short neck portion 26A that extends a short distance from the face of the diagonal front end wall 25 and a larger, generally flat outer end portion 26B.

The short neck portion 26A and larger outer end portion 26B of the tongue element 26 are sized and shaped so as to be aligned with, and slidably received through, the slot 16 in the diagonal front end wall 15 of the female member 11 when inserted therethrough, and upon relative rotation between the tongue and slot, the larger outer end portion 26B of the tongue element will be oriented out of alignment with the slot 16 to capture the outer end portion and prevent accidental removal, as described in more detail hereinafter.

For purposes of example, the slot 16 is illustrated in FIGS. 1-6, as a narrow rectangular vertical slot and the short neck portion 26A and larger outer end portion 26B of the tongue element 26 is illustrated as a narrow flat rectangular configuration having a width slightly less than the width of the slot. However, it should be understood that the slot and tongue elements may be of various other shapes, such as T-shaped or cross-shaped.

Also for purposes of example, the diagonal end walls 15 and 25 are both shown to be substantially the same angle with respect to the longitudinal axis of the bodies 12 and 22, however, it should be understood, that the diagonal end walls 15 and 25 may be of different, but complementary, angles such that the longitudinal axis the bodies 12 and 22, will become axially aligned when rotated relative to one another.

The larger outer end portion 26B of the tongue element 26 of the male member 21 may be sized and shaped so as to become frictionally or mechanically engaged with the female member 11 after it is received through the slot 16 in the diagonal front end wall 15 of the female member, and upon sufficient relative pivotal movement between the members to axially align the longitudinal axis A1 and A2 of the bodies 12 and 22, thereby frictionally or mechanically maintaining the male and female members in the engaged axially aligned position to prevent disengagement due to accidental relative rotation or relative pivotal movement.

Figure 5:
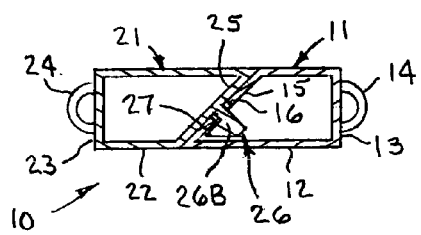
FIG. 5 is a longitudinal cross section of the releasable clasp or coupling in the latched condition with the male and female members fully pivoted and axially aligned.

For example, as shown in FIG. 5, the larger outer end portion 26B of the tongue element 26 of the male member 21 may be a wedge-shaped configuration provided with a flat surface 27 on its backside adjacent to the short neck portion 26A which is disposed at an angle sized and shaped so as to become frictionally or mechanically engaged with the backside of the diagonal end wall 15 of the body 12 of the female member 11 upon sufficient relative pivotal movement between the members to axially align the longitudinal axis A1 and A2 of the bodies 12 and 22.

Figure 7:
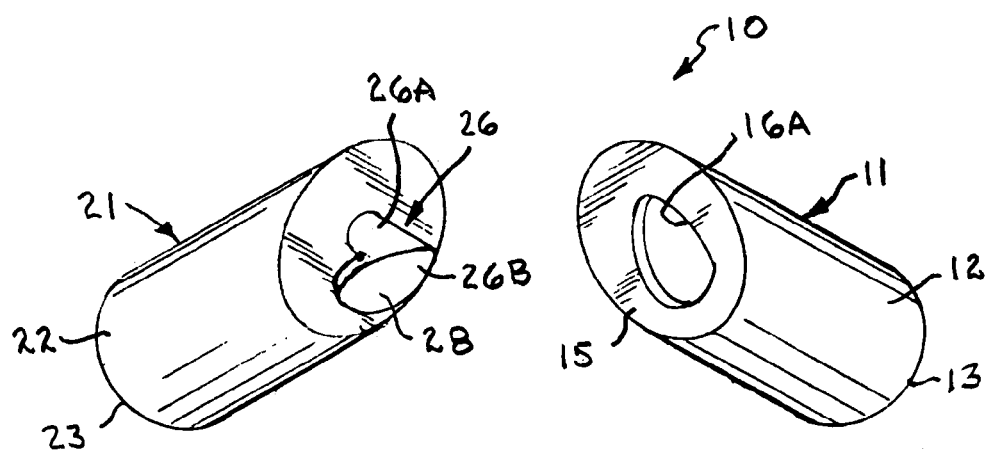
FIG. 7 is a perspective view of the releasable clasp or coupling showing the male and female members in a disengaged uncoupled condition wherein the male member has a modified key or tongue element that becomes frictionally or mechanically engaged with the female member in the latched condition when the members are fully pivoted and axially aligned.
Figure 8:
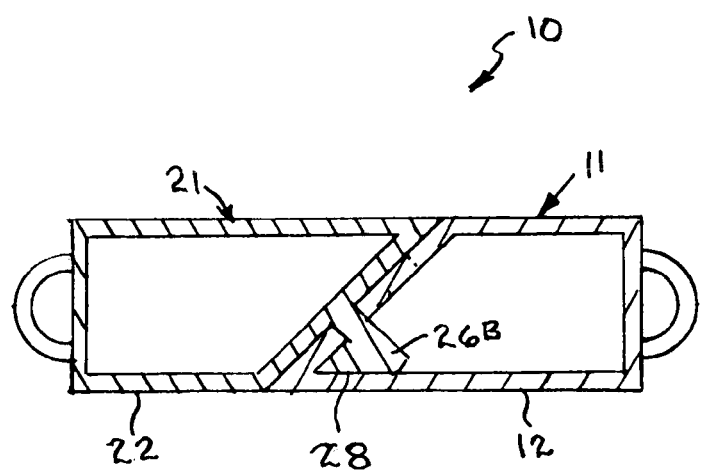
FIG. 8 is a longitudinal cross section of the releasable clasp or coupling of FIG. 7 in the latched condition with the male and female members fully pivoted and axially aligned and the key or tongue element frictionally or mechanically engaged with the female member.

Referring now to FIGS. 7 and 8, there is shown a modification of the releasable clasp or coupling 10 wherein the male member 21 has a modified key or tongue element 26 that becomes frictionally or mechanically engaged with the female member in the latched condition when the members are fully pivoted and axially aligned to maintain them in the engaged axially aligned position and prevent disengagement due to accidental relative rotation or relative pivotal movement.

In this modification, the larger outer end portion 26B of the tongue element 26 of the male member 21 may be a generally wedge-shaped configuration provided with a outwardly curved surface 28 on the side opposite the short neck portion 26A which has a radius of curvature sized so as to become frictionally or mechanically engaged with the interior curved surface of the side wall of the hollow cylindrical or tubular body 12 of the female member 1 1upon sufficient relative pivotal movement between the members to axially align the longitudinal axis A1 and A2 of the bodies 12 and 22. Also, in this modification, the slot 16A is illustrated as a generally pie-shaped slot to accommodate the larger outer end portion of the tongue element.

When the bodies 12 and 22 of the female member 11 and male member 21 are frictionally or mechanically engaged in the rotated and latched condition, as described above, the possibility of accidental disconnection or separation due to relative rotation or relative pivotal movement while the jewelry item is being worn is substantially reduced.

Although the connector for attaching the clasp or coupling to the fee ends of the flexible member, has been shown and described for purposes of example, as a loop 14, 24, on the rear end wall 13, 23, of the bodies 12, 22, it should be understood that various other conventional connectors, well known in the art, may be used for mounting the bodies on the free ends of the flexible member, such as a swivel connector.

OPERATION

Figure 2:
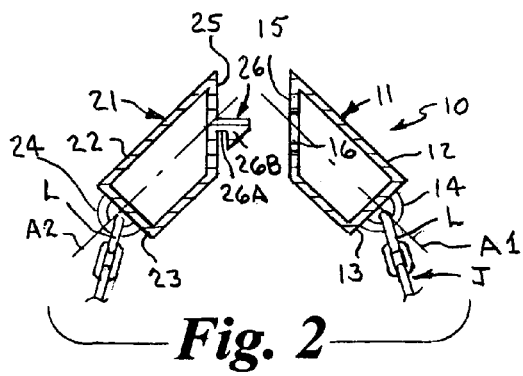
FIG. 2 is a side view of the releasable clasp or coupling in the uncoupled condition, showing the male and female members in longitudinal cross section.
Figure 3:
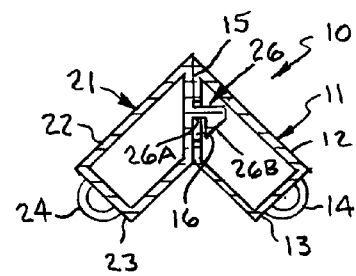
FIG. 3 is a side view of the releasable clasp or coupling, showing the male and female members in longitudinal cross section with the tongue element of the male member received through the slot of the female member, prior to relative pivotal movement the members.
Figure 4:
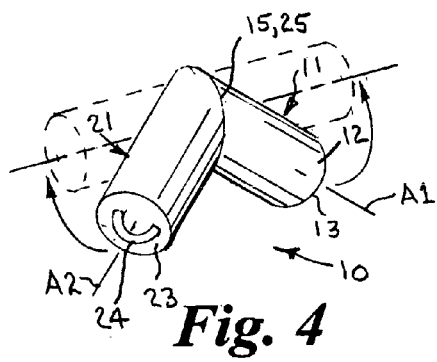
FIG. 4 is a perspective view showing the male and female members partially pivoted relative to one another.

To couple the male and female members 11 and 21, the members are positioned with their diagonal front end walls 15 and 25 oriented in spaced apart facing relation (FIGS. 1, 2 and 7). The outer end 26B of the tongue element 26 of the male member 22 is introduced through the slot 16 or 16A in the diagonal front end wall 15 of the female member 11 (FIG. 3). In this position, the front end walls 15, 25 are disposed face-to-face and the longitudinal axis A1 of the body 12 of the female member 11 and longitudinal axis A2 of the body 22 of the male member 21 are angularly disposed in outwardly diverging relation.

Figure 6:
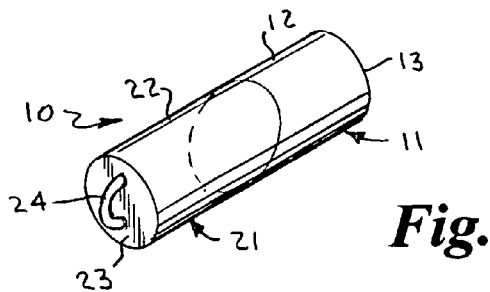
FIG. 6 is a side elevation view of the releasable clasp or coupling, shown in the latched condition.

The body 12 of the female member 11 and body 22 of the male member 21 with their front end walls 15, 25 disposed face-to-face are then pivoted relative to one another (FIG. 4) about the reduced neck portion 26A of the tongue element 26, until the longitudinal axis A1 of the body 12 of the female member 11 and longitudinal axis A2 of the body 22 of the male member 21 are axially aligned in a common straight plane. In this position, the larger outer end portion 26B of the tongue element 26 and the slot 16 have been rotated so as to be out of alignment, and the larger outer end portion of the tongue element is captured within the female member 11 to prevent accidental removal or separation (FIGS. 5 and 6).

In the latched condition, the bodies 12 and 22 of the female member 11 and male member 21 are aligned to jointly form an attractive small cylindrical or tubular configuration, which does not detract from the aesthetic appearance of the jewelry item. Since the larger outer end portion 26B of the tongue element 26 is out of alignment with the slot 16, the possibility of accidental disconnection or separation due to a pulling force while the jewelry item is being worn is substantially reduced. Also, the small cylindrical or tubular configuration of the joined female member 11 and male member 21 and their face-to-face diagonal front end walls 15, 25 substantially reduces the possibility of accidental disconnection or separation due to relative rotation or relative pivotal movement between the members while the jewelry item is being worn. Under normal conditions, the only way the joined female member 11 and male member 21 can be disconnected or separated is by manually pivoting their bodies relative to one another until the tongue element 26 of the male member 21 is aligned with the slot 16 of the female member 11.

The embodiments having a modified outer end portion 26B of the tongue element 26 of the male member 21 become frictionally or mechanically engaged with the female member 11 after it is received through the slot 16 or 16A in the diagonal front end wall 15 of the female member, and upon sufficient relative pivotal movement between the members to axially align the longitudinal axis A1 and A2 of the bodies 12 and 22, thereby frictionally or mechanically maintaining the male and female members in the engaged axially aligned position to prevent disengagement due to accidental relative rotation or relative pivotal movement.

As shown in FIG. 5, the flat surface 27 on the backside to the tongue element 26 becomes frictionally or mechanically engaged with the backside of the diagonal end wall 15 of the body 12 of the female member 11 when the members are fully pivoted and axially aligned to maintain them in the engaged axially aligned position and prevent disengagement due to accidental relative rotation or relative pivotal movement. As shown in FIG. 8, the outwardly curved surface 28 of the tongue element 26 becomes frictionally or mechanically engaged with the interior curved surface of the side wall of the hollow cylindrical or tubular body 12 of the female member 11 when the members are fully pivoted and axially aligned to maintain them in the engaged axially aligned position and prevent disengagement due to accidental relative rotation or relative pivotal movement.

With the frictionally or mechanically engageable embodiments, the male and female members 11 and 21 with become tightly engaged and prevent further relative pivotal movement when the axis of the bodies 12 and 22 are properly aligned.

To uncouple or unlatch the male and female members 11 and 21, the aligned bodies 12 and 22 of the female member 11 and male member 21 are pivoted relative to one another about their facing front end walls 15, 25, until the bodies are disposed in angularly outwardly diverging relation, and they can then be pulled apart. After the wearer has joined, pivoted, latched and unlatched the clasp or coupling a few times, they will quickly develop a feel for the position of the diagonal front end walls 15, 25 and the correct relative positions of the members for the latching and unlatching operations.

Thus, the present clasp or coupling and method of coupling allow the wearer to easily carry out the aligning and connecting and disconnecting operation relying on touch and feel, rather then sight, when the clasp or coupling cannot be seen, such as fastening the free ends of a necklace or neck chain behind their neck.

Although the clasp or coupling of the present invention is described, for purposes of example, as a clasp or coupling for uniting the two free ends of a pliable piece of jewelry such as a neck chain, a necklace, a bracelet or the like, it should be understood that the clasp structure and the method of coupling of the present invention can utilized for any type of application where it is desired to releasably connect spaced ends of a flexible member including industrial applications, for example for connecting the free ends of a rope or cable.

While this invention has been described fully and completely with special emphasis upon a preferred embodiment, it should be understood that within the scope of the appended claims the invention may be practiced otherwise than as specifically described herein.

The invention claimed is:

1. A coupling adapted to releasably interconnect spaced ends of a flexible member comprising:
    a male member having a generally tubular body extending along a longitudinal axis, a rear end adapted to be connected to a first end of the flexible member, a flat front end disposed at an angle diagonal to the longitudinal axis of the male body, and a tongue element extending perpendicularly outwardly from its said diagonal front end;
    a female member having a generally tubular body extending along a longitudinal axis, a rear end adapted to be connected to a second end of the flexible member, a flat front end disposed at an angle diagonal to the longitudinal axis of the female body, and an aperture through its front end; and
    said angle of said male member flat front end and said angle of said female member flat front end being complimentary angles;
    said tongue element being aligned with and received through said aperture when said flat front end of said male member and said flat front end of said female member are placed face to face, and upon relative pivotal movement between said male and female members, said longitudinal axis of said male member and said longitudinal axis of said female member become axially aligned and said tongue element becomes oriented out of alignment with said aperture in a coupled condition to prevent accidental removal of said tongue element and separation of said male and female members;
    said coupled male member and said female member are manually uncoupled by pivoting male member and said female member relative to one another such that the said aligned longitudinal axis of said male member and said longitudinal axis of said female member become angularly disposed in outwardly diverging relation and said tongue element becomes aligned with said aperture, and pulling said male member and said female member apart to withdraw said tongue element from said aperture.

2. The coupling according to claim 1, wherein
    said angle of said male member flat front end and said angle of said female member flat front end are complimentary angles each disposed at an angle diagonal to said longitudinal axis of said male body and said longitudinal axis of said female body, respectively, such that when said longitudinal axis of said male member and said longitudinal axis of said female member become axially aligned in the coupled condition, said generally tubular bodies of said male member and said female member jointly form a coextensive tubular configuration.

3. The coupling according to claim 1, wherein
    said male member tongue element has a short neck portion extending a short distance perpendicularly outwardly from said male member flat front end and a larger outer end portion; and
    said aperture in said female member flat front end is sized and shaped to receive said tongue element larger outer end portion;
    said larger outer end portion being oriented out of alignment with said aperture upon relative pivotal movement between said male and female members and axial alignment of said longitudinal axis of said male member and said longitudinal axis of said female member.

4. The coupling according to claim 3, wherein
    said male member tongue element larger outer end portion has a narrow generally flat wedge-shaped configuration; and
    said aperture in said female member flat front end is a generally rectangular slot.

5. The coupling according to claim 3, wherein
    said male member tongue element larger outer end portion is sized and shaped so as to become engaged with said female member after it is received through said aperture in said female member front end and upon sufficient relative pivotal movement between said male member and said female member to align said longitudinal axis of said male member and said longitudinal axis of said female member to maintain said male member and said female member in the engaged axially aligned position and prevent disengagement due to accidental relative rotation or relative pivotal movement between said male member and said female member.

6. The coupling according to claim 5 wherein
    said male member tongue element larger outer end portion is sized and shaped so as to become frictionally engaged with said female member after it is received through said aperture in said female member front end and upon sufficient relative pivotal movement between said male member and said female member to align said longitudinal axis of said male member and said longitudinal axis of said female member to frictionally maintain said male member and said female member in the engaged axially aligned position and prevent disengagement due to accidental relative rotation or relative pivotal movement between said male member and said female member.

7. The coupling according to claim 6, wherein
    said male member tongue element larger outer end portion is a generally wedge-shaped configuration having a flat surface on a backside adjacent to said short neck portion which is disposed at an angle sized and shaped so as to become frictionally engaged with a backside surface of said female member flat front end upon sufficient relative pivotal movement between said male member and said female member to align said longitudinal axis of said male member and said longitudinal axis of said female member.

8. The coupling according to claim 6, wherein said male member tongue element larger outer end portion is a generally wedge-shaped configuration having an outwardly curved surface on a side opposite said short neck portion with a radius of curvature sized so as to become frictionally engaged with an interior curved surface of said female member tubular body upon sufficient relative pivotal movement between said male member and said female member to align said longitudinal axis of said male member and said longitudinal axis of said female member.

9. A coupling method for releasably interconnecting spaced ends of a flexible member comprising the steps of:

providing a male member at a first end of the flexible member having a generally tubular body extending along a longitudinal axis, a flat front end disposed at an angle diagonal to the longitudinal axis of the male body, and a tongue element extending perpendicularly outwardly from its said diagonal front end;

providing a female member at a second end of the flexible member having a generally tubular body extending along a longitudinal axis, a flat front end disposed at an angle diagonal to the longitudinal axis of the female body, and an aperture through its said front end;

said angle of said male member flat front end and said angle of said female member flat front end being complimentary angles;

positioning said male and female members with their respective front ends oriented in spaced apart facing relation;

placing said flat front end of said male member and said flat front end of said female member face to face such that said tongue element is received through said aperture and said longitudinal axis of said male member and said longitudinal axis of said female member are angularly disposed in outwardly diverging relation; and pivoting said male member and said female member relative to one another such that said longitudinal axis of said male member and said longitudinal axis of said female member become axially aligned and said tongue element becomes oriented out of alignment with said aperture to assume a coupled condition to prevent accidental removal of said tongue element and separation of said male and female members;

pivoting said male member and said female member relative to one another such that the said aligned longitudinal axis of said male member and said longitudinal axis of said female member become angularly disposed in outwardly diverging relation and said tongue element becomes aligned with said aperture, and pulling said male member and said female member apart to withdraw said tongue element from said aperture and assume an uncoupled condition.

10. The coupling method according to claim 9, wherein said male member tongue element has an outer end portion configured to become frictionally engaged with said female member after it is received through said aperture in said female member front end; and said step of pivoting said male member and said female member relative to one another comprises pivoting said male member and said female member relative to one another such that tongue element outer end portion becomes frictionally engaged with said female member as said said longitudinal axis of said male member and said longitudinal axis of said female member become axially aligned and said tongue element becomes oriented out of alignment with aperture to assume a frictionally engaged coupled condition to maintain said male member and said female member in the engaged axially aligned position and prevent disengagement due to accidental relative rotation or relative pivotal movement between said male member and said female member.

* * * * *